Figure 1:
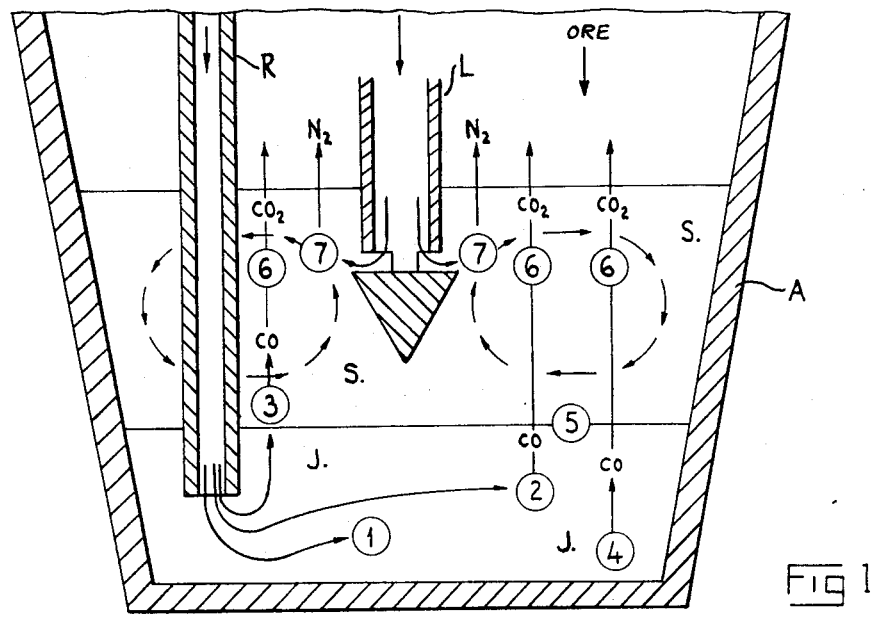

United States Patent [19]
Johnsson

[11] 3,711,275
[45] Jan. 16, 1973

[54] METHOD FOR THE PRODUCTION OF LIQUID PIG IRON OR STEEL DIRECTLY OF DRESSED ORE

[76] Inventor: M. K. Olof Johnsson, Skalviksvagen 5, Hagfors, Sweden

[22] Filed: Oct. 13, 1969

[21] Appl. No.: 865,717

[52] U.S. Cl. .................................. 75/30, 75/40
[51] Int. Cl. ............................................. C21b 13/00
[58] Field of Search ........................... 75/29, 30, 40

[56] References Cited

UNITED STATES PATENTS

| | | | |
|---|---|---|---|
| 2,612,444 | 9/1952 | Rummel | 75/40 |
| 2,865,733 | 12/1958 | Carli | 75/40 |
| 2,986,458 | 5/1961 | Johnson | 75/40 |

Primary Examiner—Dewayne Rutledge
Assistant Examiner—J. M. Davis
Attorney—Pierce, Scheffler & Parker

[57] ABSTRACT

In a reduction process wherein liquid ferrous metal is covered by an iron oxide-containing slag layer and wherein iron-containing solids are supplied to the slag from above, the smelting is favorably influenced by the direct supply of an oxygen-containing gas directly into the slag layer to such a depth therein that reducing gas formed in the layer and moving upwardly through the same is converted largely to carbon dioxide and/or water, the supply of reduction means into the iron bath being adjusted to counteract any insufficiency of carbon content in the bath.

7 Claims, 2 Drawing Figures

PATENTED JAN 16 1973 3,711,275

METHOD FOR THE PRODUCTION OF LIQUID PIG IRON OR STEEL DIRECTLY OF DRESSED ORE

The present invention is related to a method for the production of pig iron or steel by smelting reduction, wherein a bath of pig iron, or steel is covered by a slag layer containing an iron oxide, and wherein iron oxide material, iron sulphide material, scrap and/or other iron containing materials are supplied to the slag layer from above.

The production may be effected directly from dressed ore and its object is more particularly to utilize the chemical heat content of the gas, carbon monoxide and, under certain conditions, hydrogen formed in reduction of the iron oxides or in oxidation of carbon dissolved in an iron bath. Though the process is substantially designed for the production of pig iron directly from dressed ore it may also, after certain modifications, be used in eliminating carbon out of an iron bath or for resmelting of scrap.

The greater part of the pig iron production of the world is effected according to the blast-furnace process, which has a good heat economy, particularly if excess gas can be utilized. It requires, however, a charging by lumps, which involves an agglomeration cost if the raw material is dressed ore, and a rather expensive reduction agent and fuel. Further, the construction costs are great, wherefore attempts have been made more and more latterly to find other alternatives in order to get free from the agglomeration costs and be able to use a cheaper fuel and, particularly in smaller production units, diminish the construction costs.

In electrical pig iron production attempts have been made to reduce fine-grained iron ore by a fine-grained reduction means on the surface of the slag bath in the furnace, but in so doing great operational difficulties have been met with and only a very incomplete utilization for the process of the heat value of the produced carbon monoxide has been possible.

In certain proposed processes iron ore in powder form is injected together with oxygen and carbon powder in the upper portion of a furnace chamber, where a reducing flame having a high temperature is obtained, so that the ore will be reduced into liquid drops of pig iron or steel, which are collected in the lower portion of the furnace. This method has a bad heat economy and the oxygen consumption will as a rule become high.

In other methods fine-grained ore and coke powder, mineral oil or natural gas are supplied to the interior or the surface of a pig iron bath. The gas, carbon monoxide and in some cases hydrogen produced is burnt above the surface of the bath by oxygen and/or preheated air. The greatest problem in this method appears to be the heat transfer from the gas to the iron bath. By using complicated furnace structures, oxygen and/or a more or less great excess of reduction means it is however possible, in exchange for the corresponding costs to obtain a reasonable hour production from an economical point of view.

In the method according to the present invention a layer of liquid slag rich in iron oxide having the relation $$(Ca^{2+} + Mg^{2+} + Fe^{2+} + Fe^{3+})/Si^{2+} > 1$$

is supplied to a pig iron bath.

The reduction means, which may consist of coke powder, mineral oil, natural gas or similar reductant, is supplied to the pig iron bath, while dressed iron ore is supplied to the slag from above at the same time as oxygen and/or air, which may be preheated, is supplied to the upper portion of the slag layer, oxidizing FeO present into higher Fe-oxides, e.g. $Fe_3O_4$ or $Fe_2O_3$.

When using mineral oil or other higher hydrocarbons as reduction means it is convenient to use part of the heat content of the effluent gas for cracking the same.

The present invention is primarily characterized in that oxygen-containing gas is supplied directly into the slag layer to such a depth that CO and, if reduction means containing hydrogen or hydrocarbons is added, also $H_2$ formed, which moves upward through the slag layer will be converted to an extent of more than 70 percent into $CO_2$ and $H_2O$ respectively, and in that the reduction means is supplied directly into the iron bath as required, i.e. if the carbon content of the iron bath is insufficient for the smelting reduction.

The slag layer having higher Fe-oxides is thus to be as thick as to make CO moving through the same to convert into $CO_2$ to an extent of at least 70 percent. To this end the iron oxide containing slag layer is preferably to have a thickness of at least 30 cm. Further, oxygen and/or air and iron-bonded oxygen are preferably to be supplied to the upper portion of the slag cover in such a quantity and in such a manner that there is maintained all over the slag area a layer being at least 10 cm thick and having an oxidation rate $Fe^{3+}/(Fe^{3+} + Fe^{2+})$ exceeding 0.20 and preferably comprised between 0.30 and 0.67, notwithstanding reducing gases flowing from below. Since reactions at the prevailing temperature of circa 1,400° – 1,500° C proceed extremely swiftly, the oxidation rate has a greater influence on the course of the process than the thickness of the slag layer. The reaction temperature can in a simple manner be controlled by variation of the oxygen quantity supplied in dependence of the charged type of dressed ore.

The supplied quantities of reduction means, dressed ore and oxygen or air are adapted in such a manner relatively to each other, that the carbon contents of the pig iron will be circa 4 percent, that the heat requirement of the process will be met without obtaining a too great overtemperature in the slag, and that the height of the layer having higher Fe-oxides will be maintained tolerably constant and, more particularly, so that the quantity of carbon-containing reduction means increases on decreasing carbon content and decreases on increasing carbon content, that the quantity of oxygen-containing gas increases on decreasing temperature and decreases on increasing temperature and that the quantity of iron containing material decreases on decreasing height of the oxidized slag layer and increases on increasing height of said layer, or in a combination of said steps. The novelty of this method in comparison with those previously mentioned is that the heat is substantially obtained by oxidation of FeO. Since the product substantially remains in the slag the heat will be obtained in the latter which is in direct contact with the bath. By this fact the problem of heat transfer from gas to bath is circumvented. By the bath motion and the intimate contact between slag and iron bath the heat transfer therebetween will occur very swiftly. The reactions $$Fe_3O_4 + CO \rightarrow 3FeO + CO_2 \text{ and}$$

$$Fe_3O_4 + H_2 \rightarrow 3FeO + H_2O \text{ respectively}$$

are accomplished without great change of the heat content, owing to which $CO_2$ and $H_2O$ hardly will discharge with a higher temperature than the slag. The slag, which in this case serves as a combustion chamber has in comparison with the conventional free gas chamber in a furnace for the combustion of gas by air or oxygen a very small volume, which occasions small wall losses, and the more so as it is possible to select the convenient relation volume: surface for the iron bath. A further advantage of the method is the fact that the sulphur of the dressed ore will be oxidized in the oxidizing slag layer, the heat production in the oxidation of the sulphur minus the heat contents in the gaseous S-oxide is to the benefit of the process.

If it is desired to produce steel directly out of dressed iron ore it is advisable first to produce pig iron in the manner described above and subsequently to discontinue the supply of reduction means and to change the relation of dressed ore supplied to oxygen and/or air in a manner to make the iron obtain a temperature increase corresponding to the decarburization. The essential difference between this method and other refining processes, e.g., the Martin, LD, Kaldo and small Bessemer process, is the fact that the heat in the new method as well as in the pig iron production will be generated by oxidation of FeO in the sufficiently thick, sufficiently oxidized slag layer covering all the bath.

As a basic material for the method a highly enriched dressed iron ore is preferably used, since the gangue during the process will be accumulated in the slag bath making it finally impossible to maintain the relation that is necessary for the due course of the process $$(Ca^{2+} + Mg^{2+} + Fe^{2+} + Fe^{3+})/Si^{2+} > 1$$

making it necessary to tap the slag and charge new slag rich in iron oxide.

Figure 2:
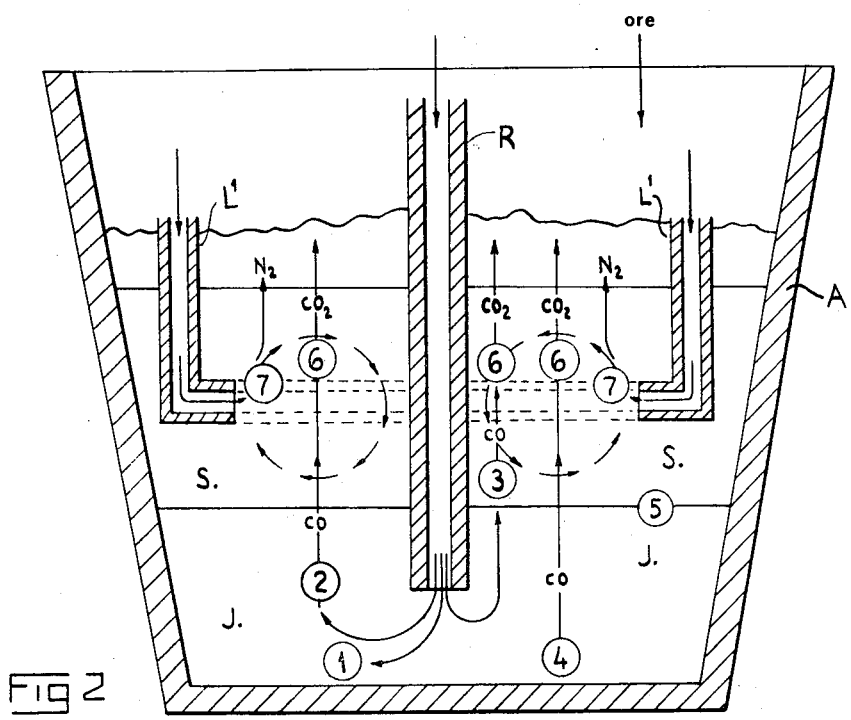

The invention will be explained more particularly in connection with the appended drawing with examples of two different embodiments of a device for carrying through the method according to the invention, FIG. 1 showing a ladle having members provided therein for the supply of oxygen containing gas and reduction means and FIG. 2 showing an alternative arrangement. Arrows included in the drawing indicate bath motions and supply of material.

In FIG. 1 a ladle designed for the production of pig iron out of dressed ore is shown and having a vertically adjustable central supply tube L for oxygen containing gas, e.g., air, and a vertically adjustable tube R provided intermediate said tube and the wall of the ladle A for the feeding of a reduction means, e.g. coke powder.

In the beginning of the process the ladle contains a more or less carbon enriched iron bath J having a temperature of for instance circa 1,450° C. This bath is covered to a height of circa 30 cm with a liquid slag S rich in iron oxide, whereupon injection of air and feeding of coke powder is commenced. By the injected air the slag bath S will be set in motion, and in different zones thereof a number of reactions will subsequently be enacted, the reactions being indicated in the Figure by the reference characters 1 – 7:

Reactions:

1. $C \rightarrow C$
2. $C + O \rightarrow CO$
3. $C + FeO \rightarrow Fe + CO$ and/or
   $C + Fe_3O_4 \rightarrow CO + 3FeO$
4. $C + O \rightarrow CO$
5. $FeO \rightarrow Fe + O$
6. $CO + Fe_3O_4 \rightarrow 3FeO + CO_2$
7. $3FeO + \frac{1}{2}O_2 \rightarrow Fe_3O_4$ By the injected air FeO will be oxidized into a higher Fe-oxide, e.g., $Fe_3O_4$, and since this reaction is exothermic, there is provided, simultaneously with the bath motion caused by the air, a heat transport in the slag bath heating the same. The carbon fed forms carbon monoxide, partly with oxygen dissolved in the iron and partly with FeO-bonded oxygen, iron being at the same time reduced and added to the iron bath J in the bottom of the ladle. The developed carbon monoxide gas will rise through the slag bath S and move upward through the slag rich in $Fe_3O_4$ being reduced to FeO and CO being oxidized to $CO_2$ which latter escapes. By the bath agitation the slag rich in FeO thus formed is made to react with the oxygen supplied in the described manner during formation of slag rich in $Fe_3O_4$, which in turn reacts again with CO etc. As new dressed ore is fed on and the process proceeds under supply of coke powder and air, reduced pig iron will gather on the bottom of the ladle, while $CO_2$ and $N_2$ escape from the surface of the slag bath. In this manner the smelting reduction of the dressed ore may be carried through until the stage where the slag owing to the loading of silicates begins to become acid, when the slag has to be tapped and new slag rich in iron oxide added. As a product in the process a pig iron will be obtained having as for instance a carbon content of 4 percent. This can subsequently in a directly associated process be refined to a desired carbon content by stopping the feeding of coke powder and increasing the air supply so that the iron obtains a temperature increase corresponding to the carbon refining. On finished refining the steel charge is tapped and the pig iron production is repeated as previously by charging slag rich in iron oxide, injecting of air and feeding of coke powder.

The process may also be carried through continuously under periodic and alternating tapping of pig iron and slag rich in silicates. The pig iron bath having risen to a certain predetermined level, it may be tapped through a tap hole in the lower portion of the ladle, while coke powder, dressed ore and air are being supplied and the reactions in the slag bath enacted. The silicate content having risen above the maximum permissible valve supply of dressed ore is discontinued whereupon the slag is tapped through a hole in the wall of the ladle. New slag rich in iron oxide is subsequently added in the ladle and additional heat, if required for the heating of the slag may in so doing be obtained by immersion of the air tube and injection of air through the pig iron bath. The desired temperature having been attained, the air tube is raised so as to open out into the slag bath, coke powder and dressed ore are fed in and the process is repeated as previously while inflation of air is going on.

In FIG. 2 there is shown a device in an alternative framing for the production of pig iron directly from dressed ore. In this case, the vertical tube R for feeding of reduction means has been provided centrally in the ladle, while one or preferably two or more air injection tubes L' have been provided between the central tube R and the wall of the ladle in such a manner that the mouth of the tube or tubes respectively will be directed horizontally towards the center.

In the example given above air is used as an oxidation means and refining means respectively. It is of course also possible to use in the method air enriched in oxygen or pure oxygen. The oxidizing gas may also be preheated as for instance to a temperature of at least 400° C. On refining pig iron according to the new method pure oxygen or an inert gas e.g. argon enriched with oxygen may be used with advantage.

As was previously mentioned a highly enriched dressed iron ore is used as a basic material in the method. The invention is however not solely restricted to the use of dressed ore but another fine-grained material rich in iron oxide may also be charged, e.g., magnetic or hematitic calcined pyrites, alone or in a mixture with dressed iron ore.

According to the invention it is also possible to supply to the slag layer from above iron sulphidic materials, e.g. iron pyrite concentrate or magnetic pyrite concentrate as well as other iron raw materials, e.g. resmelting scrap.

Besides the coke powder used in the example it is possible as has been mentioned to use solid, liquid or gaseous reduction means, as mineral oil, e.g., different types of fuel oils, natural gas, cracking gases, producer gas, water gas.

I claim:

1. A method for the production of liquid ferrous metal by smelting reduction, wherein a bath of ferrous metal is covered by an iron oxide-containing slag layer at least 30 cm thick, to which is supplied an iron-containing member of the group consisting of iron oxide material, iron sulphide material and scrap to the slag from above, in which method an oxygen-containing gas is supplied directly into the slag layer to such a depth that CO and any hydrogen formed in the reduction, moving up through the slag layer, are converted to an extent of more than 70 percent to $CO_2$ and $H_2O$ respectively, and in which the reduction means is supplied directly into the iron bath whenever the carbon content of the bath is insufficient for the smelting reduction.

2. A method according to claim 1, in which a slag rich in iron oxide is added having a relation $$(Ca^{2+} + Mg^{2+} + Fe^{2+} + Fe^{3+})/Si^{2+}$$

exceeding 1.

3. A method according to claim 1, wherein an oxidizing material selected from the group consisting of oxygen, air, and iron-bonded oxygen is supplied to the upper portion of the slag cover in such a quantity that, independently of reducing gases flowing from below, there is maintained all over the slag area a layer being at least 10 cm thick and having an oxidation rate $Fe^{3+}/(Fe^+ + Fe^{2+})$ exceeding 0.20, preferably between 0.30 and 0.67.

4. A method according to claim 1, in which the oxygen-containing gas is a member of the group consisting of air, oxygen, oxygen-enriched air or an inert gas enriched with oxygen.

5. A method according to claim 4, wherein the oxygen-containing gas is preheated to a temperature of at least 400° C.

6. A method according to claim 1, in which a reducing agent selected from the group consisting of coke powder, mineral oil, natural gas, cracking gases, producer gas and water gas is added as reduction means.

7. A method according to claim 1, in which the reduction means, the oxygen-containing gas and the iron-containing material are supplied in such proportions that the height of the oxidized slag layer is maintained substantially constant and that the iron bath obtains at a desired temperature a carbon content of about 4 percent and that the quantity of carbon-containing reduction means increases on decreasing carbon content and decreases on increasing carbon content, that the quantity of oxygen-containing gas increases on decreasing temperature and decreases on increasing temperature and that the quantity of iron-containing material decreases on decreasing height of the oxidized slag layer and increases on increasing height of said layer.

* * * * *

UNITED STATES PATENT OFFICE
CERTIFICATE OF CORRECTION

Patent No. 3,711,275          Dated January 16, 1973

Inventor(s)  M. K. Olof Johnsson

It is certified that error appears in the above-identified patent and that said Letters Patent are hereby corrected as shown below:

In Claim 3, line 8, the fraction should read

-- $Fe^{3+}/Fe^{3+} + Fe^{2+}$ --.

Signed and sealed this 22nd day of May 1973.

(SEAL)
Attest:

EDWARD M. FLETCHER, JR.
Attesting Officer

ROBERT GOTTSCHALK
Commissioner of Patents